(12) United States Patent
Schneider et al.

(10) Patent No.: US 9,151,086 B2
(45) Date of Patent: Oct. 6, 2015

(54) STORAGE COMPARTMENT ARRANGEMENT FOR A MOTOR VEHICLE WITH A DISPLACEABLE STORAGE COMPARTMENT COVER

(71) Applicant: GM GLOBAL TECHNOLOGY OPERATIONS LLC, Detroit, MI (US)

(72) Inventors: Tobias Schneider, Huenfelden-Mensfelden (DE); Andreas Lang, Werlgesheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 18 days.

(21) Appl. No.: 13/712,454

(22) Filed: Dec. 12, 2012

(65) Prior Publication Data

US 2013/0158745 A1   Jun. 20, 2013

(30) Foreign Application Priority Data

Dec. 15, 2011   (DE) .......................... 10 2011 121 308

(51) Int. Cl.
G05D 3/00    (2006.01)
G01V 3/00    (2006.01)
E05B 83/28   (2014.01)
B60R 7/06    (2006.01)
E05B 81/06   (2014.01)
E05B 47/00   (2006.01)

(52) U.S. Cl.
CPC . *E05B 83/28* (2013.01); *B60R 7/06* (2013.01); *E05B 81/06* (2013.01); *E05B 2047/0094* (2013.01)

(58) Field of Classification Search
USPC .......................................... 701/2; 340/855.3
See application file for complete search history.

(56) References Cited

U.S. PATENT DOCUMENTS

| 4,670,746 A | * | 6/1987 | Taniguchi et al. ........... 340/5.62 |
| 5,736,793 A | * | 4/1998 | Jahrsetz et al. .............. 307/10.1 |
| 7,500,704 B2 | | 3/2009 | Herrera et al. |

FOREIGN PATENT DOCUMENTS

| DE | 19530721 A1 | 2/1997 |
| DE | 10340817 A1 | 3/2005 |

OTHER PUBLICATIONS

German Patent Office, Search Report for German Application No. 102011121308.6, dated Sep. 26, 2012.

* cited by examiner

*Primary Examiner* — Muhammad Shafi

(74) *Attorney, Agent, or Firm* — Ingrassia Fisher & Lorenz PC

(57) ABSTRACT

A storage compartment arrangement for a motor vehicle, in particular an automobile, is provided. The arrangement can include a storage compartment, a storage compartment cover displaceable by a drive, a key and a control device, which is configured to cooperate with the key and to displace, in particular to close, the storage compartment cover on the basis of an actuation of the key.

9 Claims, 1 Drawing Sheet

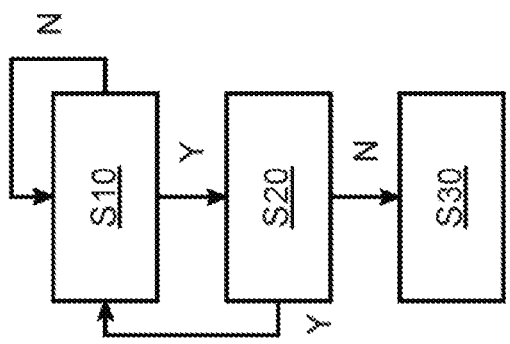
Fig. 2
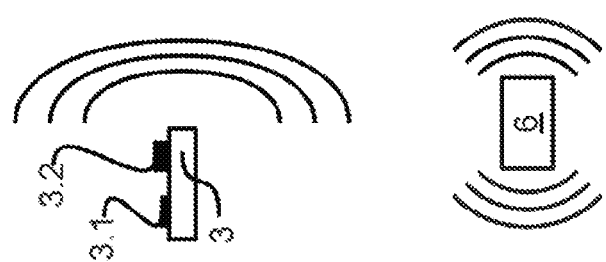
Fig. 1
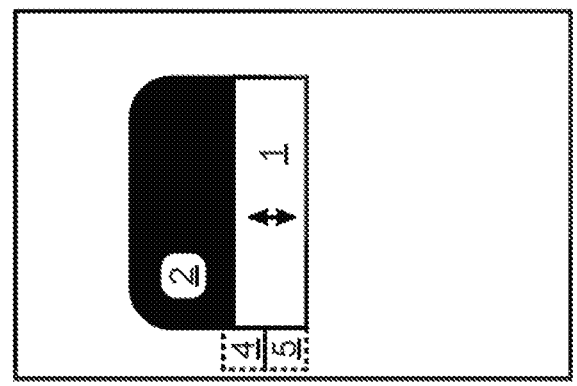

STORAGE COMPARTMENT ARRANGEMENT FOR A MOTOR VEHICLE WITH A DISPLACEABLE STORAGE COMPARTMENT COVER

CROSS-REFERENCE TO RELATED APPLICATION

This application claims priority to German Patent Application No. 10 2011 121 308.6, filed Dec. 15, 2011, which is incorporated herein by reference in its entirety.

TECHNICAL FIELD

The present disclosure relates to a storage compartment arrangement for a motor vehicle, in particular an automobile, with a storage compartment cover displaceable by a drive, a motor vehicle with such a storage compartment arrangement and a method for displacing the storage compartment cover of such a storage compartment arrangement.

BACKGROUND

It is known to optionally cover a storage compartment of an automobile with a storage compartment cover which is displaceable by a drive. In particular, when the storage compartment cover in a preferred embodiment has a display, for example of a vehicle information, navigation, entertainment and/or telecommunication system ("articulating display"), advantageously a storage site, in particular for valuable objects, can be provided which, when the cover is closed, is not visible and is protected from access. However, this presupposes that the driver, on leaving the vehicle, closes the cover. If he has forgotten this, hitherto he has to laboriously open the vehicle again, get in and close the cover directly.

From DE 103 40 817 A1 it is known, in connection with a so-called comfort entry/go function, to unlock and lock a glove compartment lock by remote control.

Therefore, it may be desirable to improve the operating comfort of a motor vehicle. In addition, other objects, desirable features and characteristics will become apparent from the subsequent summary and detailed description, and the appended claims, taken in conjunction with the accompanying drawings and this background.

SUMMARY

According to various aspects of the present disclosure, a storage compartment arrangement has one or more storage compartments, wherein at least one, generally several storage compartments are optionally able to be covered completely or at least partially by a storage compartment cover which is displaceable by a drive. Two or more storage compartments can be covered by the same or different storage compartment covers. Likewise, two or more storage compartment covers can be provided for covering one storage compartment. A covering is understood here to mean in particular a partitioning, generally preventing access and/or opaque, with respect to an interior of the motor vehicle. In another exemplary embodiment, a storage compartment cover here can be able to be arrested in one or more positions in one example, by a drive and/or a closing device, generally at least one mechanical lock.

A drive for displacing one or more storage compartment covers can have in particular one or more electric motors, magnets, hydraulic and/or pneumatic actuators such as hydraulic or respectively pneumatic cylinders, and suchlike. Generally, at least one storage compartment cover is displaceable by motor, in one example, electric motor.

A storage compartment is generally arranged in the interior of a motor vehicle, in one example, it can be arranged, in particularly integrated, on an instrument panel and/or a center console.

According to another aspect of the present disclosure, a key and a control device are provided, which is configured to cooperate with the key. The key can be a mechanical key for the mechanical opening and/or closing at least of one mechanical lock of the motor vehicle. Additionally or alternatively, the key can be configured for the contactless actuation of the motor vehicle, in particular a locking system of the motor vehicle. In another exemplary embodiment, the control device can be connected with a central locking system of the motor vehicle or can be integrated therein, in particular can be formed by the latter.

The key and control device can cooperate by contact. In particular, a mechanical actuation of the key, for example the insertion into and/or the withdrawal from a lock and/or the opening and/or closing of a lock, can bring about an electrical signal to the control device, for example via a bus line of a central locking system. Additionally or alternatively, the key and control device can cooperate in a contactless manner, in particular wirelessly, generally via radio waves, microwaves, ultrasound, infrared light or suchlike. A cooperation is understood to mean here in a generalized manner in particular a communication or respectively the sending of a signal from one of the key and the control device and the receiving and processing from the other of the key and the control device. The communication can be one-sided, in particular only a sending of signals from the key to the control device can be provided. Likewise, a bidirectional communication can also be provided, in which the key and control device send and receive signals reciprocally.

According to an aspect of the present disclosure, the control device displaces one or more storage compartment covers on the basis of an actuation of the key. For this, the control device can actuate the drive accordingly, in particular can send control signals to the drive, supply the drive with energy or suchlike. In another exemplary embodiment, the control device can open and/or close the storage compartment cover(s) completely or partially. If several storage compartment covers are provided, these can be actuated jointly or respectively uniformly by the control device. In particular, the control devices can close all the storage compartment covers, substantially completely. Likewise, provision can be made to actuate various storage compartment covers differently, for example to only close selected storage compartment covers. In another exemplary embodiment, by various actuations of the key different storage compartment covers can be actuated. Additionally or alternatively it is possible, also in the case of only one storage compartment cover, to actuate this/these storage compartment cover(s) differently by various actuations of the key. For example, by a singular actuation of a button of the key, a closing of a storage compartment cover can be commanded. By multiple actuation of the same button and/or by actuation of a further button of the key, an opening of the same storage compartment cover, a closing of a further storage compartment cover etc. can be commanded. An actuation of the key is understood to mean here in a generalized manner in particular a handling of the key such that a signal is brought about to the control device. In an exemplary embodiment, the key has one or several input means, in particular buttons, switches, sensors or suchlike, on the actuation of which, for example touching, depressing or suchlike, a signal to the control device is brought about. Additionally or alternatively, the mechanical actuation of the key, for example the insertion into and/or the withdrawal from a lock and/or the opening and/or closing of a lock can also bring about a signal to the control device. Various actuations can then be constituted for example by actuating various input means, in the various actuating of an input means, for instance a different number and/or duration of button actuations, a turning of the key in a mechanical lock in various directions and/or about various angles, and suchlike.

In an exemplary embodiment, at least one storage compartment cover has a display and/or operating device, in particular for an information, entertainment, navigation and/or telecommunication device of the motor vehicle. A display for an information device of the motor vehicle can be, in particular, a speed, engine speed, temperature, fluid level, in particular fuel and/or oil display or suchlike. An entertainment device of the motor vehicle can be, in particular, an audio and/or video device, for instance a radio, a cassette, CD or DVD player. The device can be provided for displaying and/or operating and for this can have in particular at least one display, in particular an LCD display, a touchscreen and/or one or more input means, in particular buttons, switches, sensors or suchlike. In this way, the storage compartment cover combines a covering and a display and/or operating functionality, the space behind a display and/or operating device, which is in any case necessary, is utilized effectively, and can in addition be concealed so as to be inconspicuous when the cover is closed.

The control device can displace one or more storage compartment covers on the basis of a vehicle closure actuation. In particular, provision can be made that with a vehicle closure actuation, one or more, in particular all the storage compartment covers are automatically closed.

Additionally or alternatively, an individual cover displacement actuation of the key can be provided, which only brings about the displacement of one or more storage compartment covers. In particular, a distinct input means and/or a distinct actuation, in particular an actuation pattern with a predetermined number and/or duration of actuations, can be provided and associated with the displacement of the storage compartment cover(s). For example, a distinct key can be provided which only commands a closing of the storage compartment cover(s). Likewise, a button which closes a central locking system wirelessly on a singular actuation, can command a closing of the storage compartment cover(s) on multiple and/or longer actuation.

In another exemplary embodiment, an actuation and/or a state of the storage compartment cover(s), in particular a closed state, is indicated by a display device. This can be a display device of a storage compartment cover itself. Thus, for instance, a screen of a storage compartment cover can light up briefly when it is being closed or is closed. In another exemplary embodiment, the display device for displaying an actuation and/or a state of a storage compartment cover is a lighting- and/or blinker device of the motor vehicle. For example, headlamps, an interior lighting arrangement and/or one or more blinkers or respectively direction indicators of the vehicle can light up once or several times, in order to indicate that one or more storage compartment covers are being closed or are closed.

In another exemplary embodiment, at least one storage compartment has one or more electrical connections, generally in order to connect a mobile apparatus, such as for instance a cellphone, a handheld, a portable storage medium or suchlike with the vehicle. In particular, a storage compartment can have one or more USB connections or suchlike. In storage compartments with such connections in fact the risk exists that valuable apparatus which is connected there remains unprotected when the storage compartment cover is not closed.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 illustrates a storage compartment arrangement according to an exemplary embodiment of the present disclosure; and FIG. 2 illustrates a method for displacing a storage compartment cover of the storage compartment arrangement of FIG. 1 according to an exemplary embodiment of the present disclosure.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows a center console of an automobile which is not illustrated further. Integrated into this is a storage compartment 2, which has a USB connection for a cellphone or suchlike (not illustrated).

The storage compartment 2 can be optionally closed by a storage compartment cover 1, on which a touchscreen of a car navigation and/or entertainment device is arranged in a manner which is not illustrated in further detail. For this, a control device 4 is provided, indicated in dashed lines in FIG. 1, behind the center console, which control device actuates an electric motor 5 which can displace the storage compartment cover 1 in the manner indicated by the movement arrow in FIG. 1. The control device 4 can be commanded for example by touching the storage compartment cover 1, in order to open or close the storage compartment cover 1.

A key 3 is provided for the wireless opening and closing of a central locking system of the motor vehicle. For this, it has two input means in the form of buttons 3.1, 3.2. On a single short pressing of the one button 3.1, a radio signal is sent to the central locking system, which thereupon locks all the external locks of the motor vehicle, in one example, its door locks. On a single short pressing of the other button 3.2, another radio signal is sent to the central locking system, which thereupon unlocks all the external locks of the motor vehicle, in one example, its door locks.

By longer pressing of the one button 3.1, a radio signal is sent to the control device 4, which thereupon completely closes the storage compartment cover 1 by means of the electric motor 4, in so far as it is not already closed. By longer pressing of the other button 3.2, another radio signal is sent to the control device 4, which thereupon completely opens the storage compartment cover 1 by means of the electric motor 4, in so far as it is not already open. If, or respectively as soon as, the storage compartment cover 1 is completely closed, the control device 4 activates four blinkers of the motor vehicle, one blinker 6 of which is illustrated as a representative in FIG.

1, so that these flash briefly several times and thus indicate that the storage compartment cover 1 is completely closed.

Likewise, a closing of the storage compartment cover 1 can also be commanded by simultaneous actuating of the button 3.1 and/or 3.2 or another actuation pattern. In another exemplary embodiment, which is not illustrated, a distinct button can also be provided, by the actuation of which a closing of the storage compartment cover 1 can be commanded. In another exemplary embodiment, a signal emitted by the key 3 can also be received by the central locking system and can be passed on to the control device 4. In another exemplary embodiment, the control device 4 can be integrated into the central locking system; in one example, provision can be made that the central locking system also actuates the electric motor 5.

FIG. 2 shows a method for the displacement of the storage compartment cover 1: in S10 the control device 4 checks, for example cyclically, whether an actuating signal has been received by the key 3. If this is not the case (S10: "N"), the control device 4 remains passive. If it has received an actuating signal from the key 3 (S10: "Y"), it checks in S20 whether the storage compartment cover 1 is already completely closed. If this is the case (S20: "N"), the control device 4 actuates the blinkers 6 and waits for further actuating signals. If, on the other hand, the storage compartment cover 1 is not yet completely closed (S20: "N"), as illustrated in FIG. 1, the control device 4 actuates the electric motor 5 in S30 such that it completely closes the storage compartment cover 1, and the blinkers 6, as soon as the storage compartment cover 1 is completely closed.

In another exemplary embodiment, the control device 4 does not check cyclically whether an actuating signal has been received by the key 3, but rather is activated by such an actuating signal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A storage compartment arrangement for a motor vehicle, comprising:
    a storage compartment;
    a storage compartment cover displaceable by a drive;
    a key; and
    a control device that cooperates with the key to displace the storage compartment cover on the basis of an actuation of the key,
    wherein the storage compartment cover has at least one of a display and an operating device.

2. The storage compartment arrangement according to claim 1, wherein the key and the control device communicate wirelessly.

3. The storage compartment arrangement according to claim 1, wherein the storage compartment has at least one electrical connection.

4. A storage compartment arrangement for a motor vehicle, comprising:
    a storage compartment;
    a storage compartment cover displaceable by a drive;
    a key; and
    a control device that cooperates with the key to displace the storage compartment cover on the basis of an actuation of the key,
    wherein the storage compartment cover includes at least one of a display and an operating device for at least one of an information, entertainment, navigation and telecommunication arrangement of the motor vehicle.

5. A storage compartment arrangement for a motor vehicle, comprising:
    a storage compartment;
    a storage compartment cover displaceable by a drive;
    a key; and
    a control device that cooperates with the key to displace the storage compartment cover on the basis of an actuation of the key,
    wherein the control device displaces the storage compartment cover on the basis of at least one of a vehicle closing actuation and an individual cover displacement actuation of the key.

6. A storage compartment arrangement for a motor vehicle, comprising:
    a storage compartment;
    a storage compartment cover displaceable by a drive;
    a key; and
    a control device that cooperates with the key to displace the storage compartment cover on the basis of an actuation of the key; and
    a display device for indicating at least one of an actuation and a state of the storage compartment cover.

7. The storage compartment arrangement according to claim 6, wherein the display device for indicating at least one of the actuation and the state of the storage compartment cover is at least one of a lighting and a blinker device of the motor vehicle.

8. A method for displacing a storage compartment cover of a storage compartment arrangement, comprising:
    actuating of a key, wherein the key and a control device cooperate in a contactless manner;
    displacing the storage compartment cover on the basis of the actuation of the key;
    displacing the storage compartment cover on the basis of at least one of a vehicle closure actuation and an individual cover displacement actuation of the key; and
    indicating at least one of an actuation and a state of the storage compartment cover by a display device.

9. A method for displacing a storage compartment cover of a storage compartment arrangement, comprising:
    actuating of a key, wherein the key and a control device cooperate in a contactless manner;
    displacing the storage compartment cover on the basis of the actuation of the key;
    displacing the storage compartment cover on the basis of at least one of a vehicle closure actuation and an individual cover displacement actuation of the key; and
    indicating the at least one of the actuation and the state of the storage compartment cover using at least one of a lighting and a blinker device of the motor vehicle.

* * * * *